United States Patent
Kim (10) Patent No.: US 9,715,204 B2
(45) Date of Patent: Jul. 25, 2017

(54) DISCHARGE CIRCUIT UNIT AND IMAGE FORMING APPARATUS HAVING THE SAME

(71) Applicant: SAMSUNG ELECTRONICS CO., LTD., Suwon-si, Gyeonggi-do (KR)

(72) Inventor: Jin Ha Kim, Cheongwon-gun (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 258 days.

(21) Appl. No.: 14/282,261

(22) Filed: May 20, 2014

(65) Prior Publication Data
US 2015/0022162 A1 Jan. 22, 2015

(30) Foreign Application Priority Data
Jul. 19, 2013 (KR) ........................ 10-2013-0085336

(51) Int. Cl.
| | |
|---|---|
| H02J 7/00 | (2006.01) |
| H02J 7/34 | (2006.01) |
| G03G 15/00 | (2006.01) |
| H02M 1/00 | (2006.01) |
| H02M 1/32 | (2007.01) |

(52) U.S. Cl.
CPC ......... *G03G 15/5004* (2013.01); *G03G 15/80* (2013.01); *H02M 2001/0032* (2013.01); *H02M 2001/322* (2013.01)

(58) Field of Classification Search
CPC ............................................... H02M 2001/322
USPC ....................................................... 320/166
See application file for complete search history.

(56) References Cited

U.S. PATENT DOCUMENTS

| | | | | |
|---|---|---|---|---|
| 2005/0116764 A1* | 6/2005 | Nagai | ................... | H02J 7/0031 327/530 |
| 2011/0025278 A1* | 2/2011 | Balakrishnan | .......... | H02M 1/32 320/166 |
| 2011/0068751 A1* | 3/2011 | Lin | ........................ | H02M 1/126 320/166 |
| 2011/0122668 A1* | 5/2011 | Lo | ........................... | H02J 9/061 363/126 |
| 2012/0207505 A1* | 8/2012 | Kobayashi | .............. | H02M 1/32 399/88 |
| 2013/0002209 A1* | 1/2013 | Voegele | ................... | H02M 1/32 320/166 |

* cited by examiner

*Primary Examiner* — Samuel Berhanu
*Assistant Examiner* — Tarikh Rankine
(74) *Attorney, Agent, or Firm* — Staas & Halsey LLP (57) ABSTRACT

A discharge circuit unit for minimizing standby power occurring in a standby mode and an image forming apparatus having the same are provided. The discharge circuit unit is connected to an input line of alternating current (AC) power and discharges a capacitive element for reducing noises. The discharge circuit unit includes a discharge circuit including first and second resistance units connected in series to discharge the capacitive element in response to a discharge control signal generated when an input of the AC power is interrupted, and a detection circuit that detects whether the input of the AC power is interrupted, and includes third and fourth resistance units connected in series so as to generate the discharge control signal when it is detected that the input of the AC power is interrupted. Each of the first to fourth resistance units includes at least one of a resistor and a switch.

17 Claims, 12 Drawing Sheets

DISCHARGE CIRCUIT UNIT AND IMAGE FORMING APPARATUS HAVING THE SAME

CROSS-REFERENCE TO RELATED APPLICATIONS

This application is related to, and claims the priority benefit of, Korean Patent Application No. 10-2013-0085336, filed on Jul. 19, 2013, in the Korean Intellectual Property Office, the disclosure of which is incorporated herein by reference.

BACKGROUND

1. Field

Embodiments relate to a discharge circuit unit and an image forming apparatus having the same, and more particularly, to a discharge circuit unit for reducing standby power and an image forming apparatus having the same.

2. Description of the Related Art

From the viewpoint of environmental protection, standby power regulations for electric products are strictly enforced for energy saving, for example, in the Americas (e.g., EPA1.2) and Europe (e.g., ErP step 2). To meet the standby power regulations, a variety of efforts are made to reduce standby power in the electric products.

An electromagnetic interference (EMI) filter for removing noise may be installed on an input terminal of a power supply (e.g., switching mode power supply (SMPS)). When electric charges charged in an X-capacitor (hereinafter referred to as "X-cap") provided for the EMI filter flow to metal terminals of a plug in the event of plug-off, this may give rise to a problem with safety. To attempt to address this problem, a discharge resistor for discharging the electric charges charged in the X-cap may be used. However, due to the discharge resistor, power loss may occur in a standby mode. This power loss counters efforts to reduce the standby power in the electric products. A solution to such a problem is desired.

SUMMARY

It is an aspect of an exemplary embodiment to provide a discharge circuit unit for minimizing standby power occurring in a standby mode of an electric product.

Additional aspects of embodiments are set forth in part in the description which follows and, in part, will be obvious from the description, or may be learned by practice of the invention.

In accordance with an aspect of an embodiment, a discharge circuit unit is connected to an input line of alternating current (AC) power and discharges a capacitive element for reducing noises. The discharge circuit unit includes a discharge circuit that includes first and second resistance units connected in series so as to discharge the capacitive element in response to a discharge control signal generated when an input of the AC power is interrupted, and a detection circuit that detects whether the input of the AC power is interrupted, and includes third and fourth resistance units connected in series so as to generate the discharge control signal when it is detected that the input of the AC power is interrupted. Each of the first to fourth resistance units includes at least one of a resistor and a switch.

The third and fourth resistance units of the detection circuit may have a relatively greater resistance value than the first and second resistance units of the discharge circuit.

The first resistance unit of the discharge circuit may include first and second resistors, and the second resistance unit of the discharge circuit may include first and second switches.

The first resistor, the first switch, the second switch, and the second resistor may be connected in series between opposite ends of the input line of the AC power, and the first and second switches may be turned on or off by the discharge control signal.

The first and second switches of the discharge circuit may be N-channel enhancement type metal oxide semiconductor field effect transistors (MOSFETs).

Sources of the first and second switches may be interconnected to form a first node. Drains of the first and second switches may be connected to the first and second resistors, respectively. The discharge control signal may be input into gates of the first and second switches.

The first and second resistors of the discharge circuit may have the same resistance value.

The third resistance unit of the detection circuit may include third and fourth resistors, and the fourth resistance unit of the detection circuit may include third and fourth switches.

The third resistor, the third switch, the fourth switch, and the fourth resistor may be connected in series between opposite ends of the input line of the AC power.

The detection circuit may be configured so that the third and fourth switches are turned on and off by the input and interruption of the AC power, and the discharge control signal is generated by turning on the third and fourth switches.

The third and fourth switches of the detection circuit may be PNP type bipolar transistors.

The detection circuit may be configured so that collectors of the third and fourth switches are interconnected and connected to the first node, emitters of the third and fourth switches are connected to the third and fourth resistors respectively, and the discharge control signal is output from the emitters of the third and fourth switches.

The detection circuit may be configured so that a fifth resistor is connected between the emitter and a base of the third switch, a second capacitor is connected between the base of the third switch and the first node, a sixth resistor is connected between the emitter and a base of the fourth switch, a third capacitor is connected between the base of the fourth switch and the first node, a seventh resistor is connected in parallel to the second capacitor, and an eighth resistor is connected in parallel to the third capacitor.

The third and fourth resistors of the detection circuit may have the same resistance value.

In accordance with an aspect of an embodiment, an image forming apparatus has a discharge circuit unit that is connected to an input line of alternating current (AC) power and discharges a capacitive element for reducing noises, in which the discharge circuit unit includes a discharge circuit that includes first and second resistance units connected in series so as to discharge the capacitive element in response to a discharge control signal generated when an input of the AC power is interrupted, and a detection circuit that detects whether the input of the AC power is interrupted, and includes third and fourth resistance units connected in series so as to generate the discharge control signal when it is detected that the input of the AC power is interrupted. Each of the first to fourth resistance units includes at least one of a resistor and a switch.

The third and fourth resistance units of the detection circuit may have a relatively greater resistance value than the first and second resistance units of the discharge circuit.

The first resistance unit of the discharge circuit may include first and second resistors, and the second resistance unit of the discharge circuit may include first and second switches.

The first and second resistors of the discharge circuit may have the same resistance value.

The third resistance unit of the detection circuit may include third and fourth resistors, and the fourth resistance unit of the detection circuit may include third and fourth switches.

The third and fourth switches may be turned on and off by the input and interruption of the AC power, and the discharge control signal may be generated by turning on the third and fourth switches.

The third and fourth resistors of the detection circuit may have the same resistance value.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
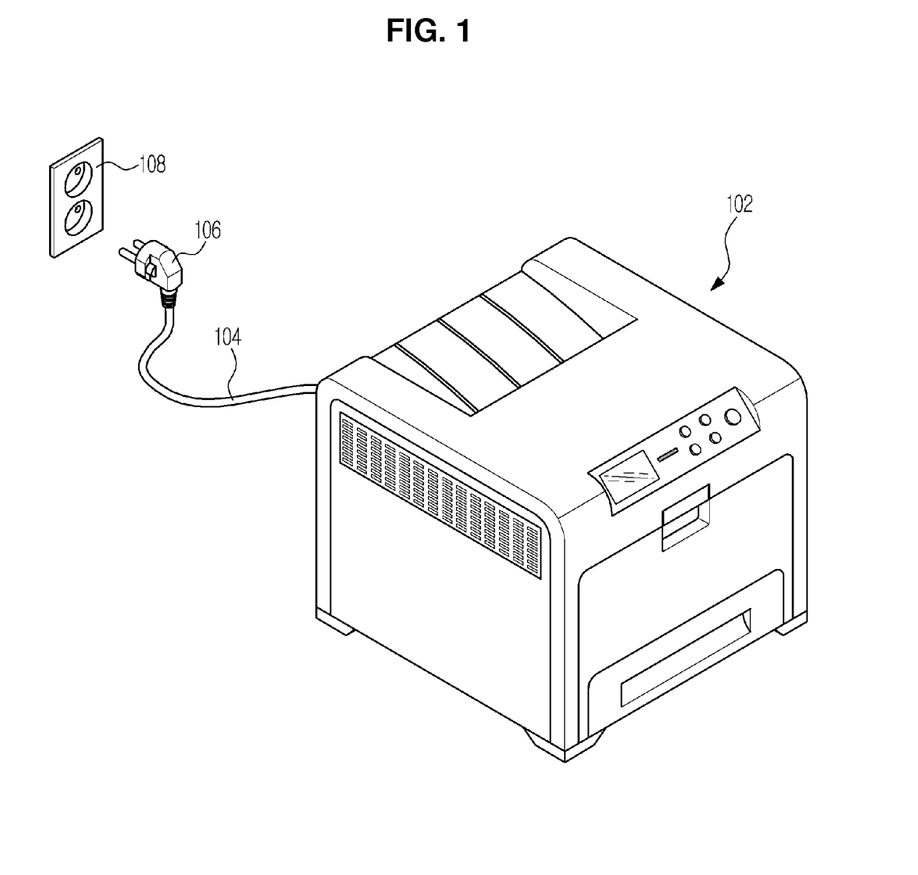
FIG. 1 illustrates a laser printer that is an image forming apparatus according to an embodiment.

FIG. 1 illustrates a laser printer that is an image forming apparatus according to an embodiment. An image forming apparatus 102 may be provided with a power cable 104 for receiving power. A plug 106 may be provided at one end of the power cable 104. The plug 106 may be inserted into a socket 108 of a plug receptacle or a power strip. Thereby, commercial alternating current (AC) power supplied from an external power source can be supplied to the image forming apparatus 102. The image forming apparatus 102 may be supplied with power through the plug 106 inserted into the socket 108 and the power cable 104, and performs an operation associated with image processing. Inserting the plug 106 into the socket 108 may be referred to as plug-on, and separating the plug 106 inserted into the socket 108 from the socket 108 may be referred to as plug-off.

Figure 2:
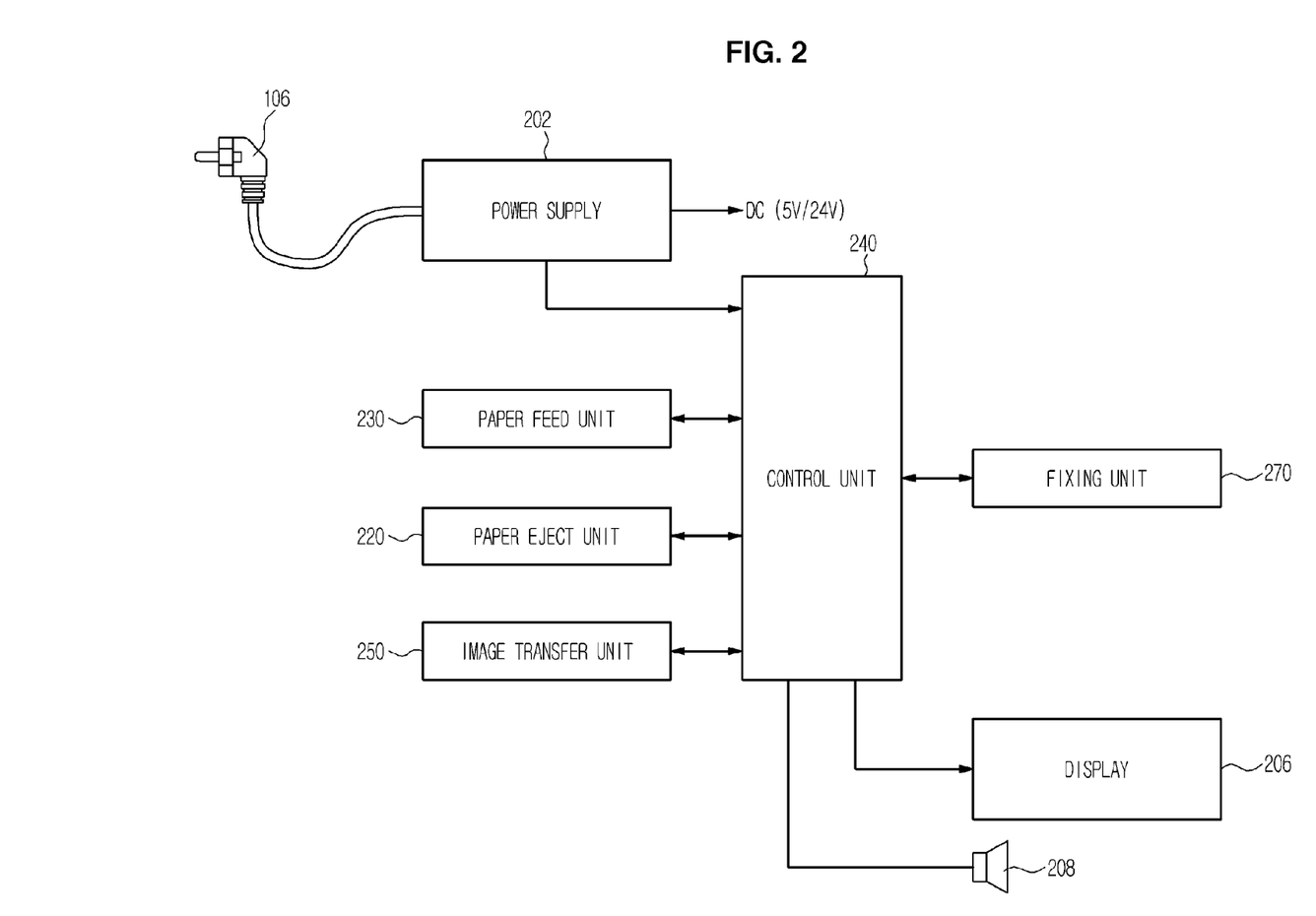
FIG. 2 illustrates a control system of the image forming apparatus illustrated in FIG. 1.

FIG. 2 illustrates an exemplary control system of a image forming apparatus, for example, as illustrated in FIG. 1. As illustrated in FIG. 2, a control unit 240 for controlling overall operations of the image forming apparatus 102 may be electrically connected, for example, to a paper feed unit 230, a paper eject unit 220, an image transfer unit 250, a fixing unit 270, a display 206, and a speaker 208 so as to be able to conduct communication. A power supply (e.g., switching mode power supply (SMPS)) 202 generates system direct current (DC) powers of 5 V and 24 V by AC-DC conversion, and supplies the generated power to the control unit 240, the image transfer unit 250, for example. The DC power of 5 V may be supplied to the control unit 240 made up of a microprocessor, circuit elements, etc. The DC power of 24 V may be supplied to the fixing unit 270. The system DC powers of 5 V and 24 V output from the power supply 202 may be selectively supplied to other components of the image forming apparatus 102. The power supply 202 may supply the input commercial power to varied components (e.g., a fixing heater of the fixing unit 270). The paper feed unit 230 feeds a printing medium (e.g., paper) stacked in a paper feed cassette to the image transfer unit 250. The image transfer unit 250 forms a predetermined image in response to an image signal, and transfers the formed image to an image plane of the printing medium. The fixing unit 270 fixes, e.g., semi-permanently fixes the image transferred to the printing medium. The paper eject unit 220 ejects the printing medium to which the image is fixed by the fixing unit 270 to the outside. The control unit 240 controls the operation, e.g., overall operations of the image forming apparatus 102 and may be electrically connected to a plurality of sensors for detecting conditions of the components of the image forming apparatus 102 so as to be able to conduct communication. The display 206 displays guide messages for informing a user of information about operations and/or conditions of the image forming apparatus 102. The speaker 208 outputs a guide sound and/or a warning sound generated during the operation of the image forming apparatus 102.

Figure 3:
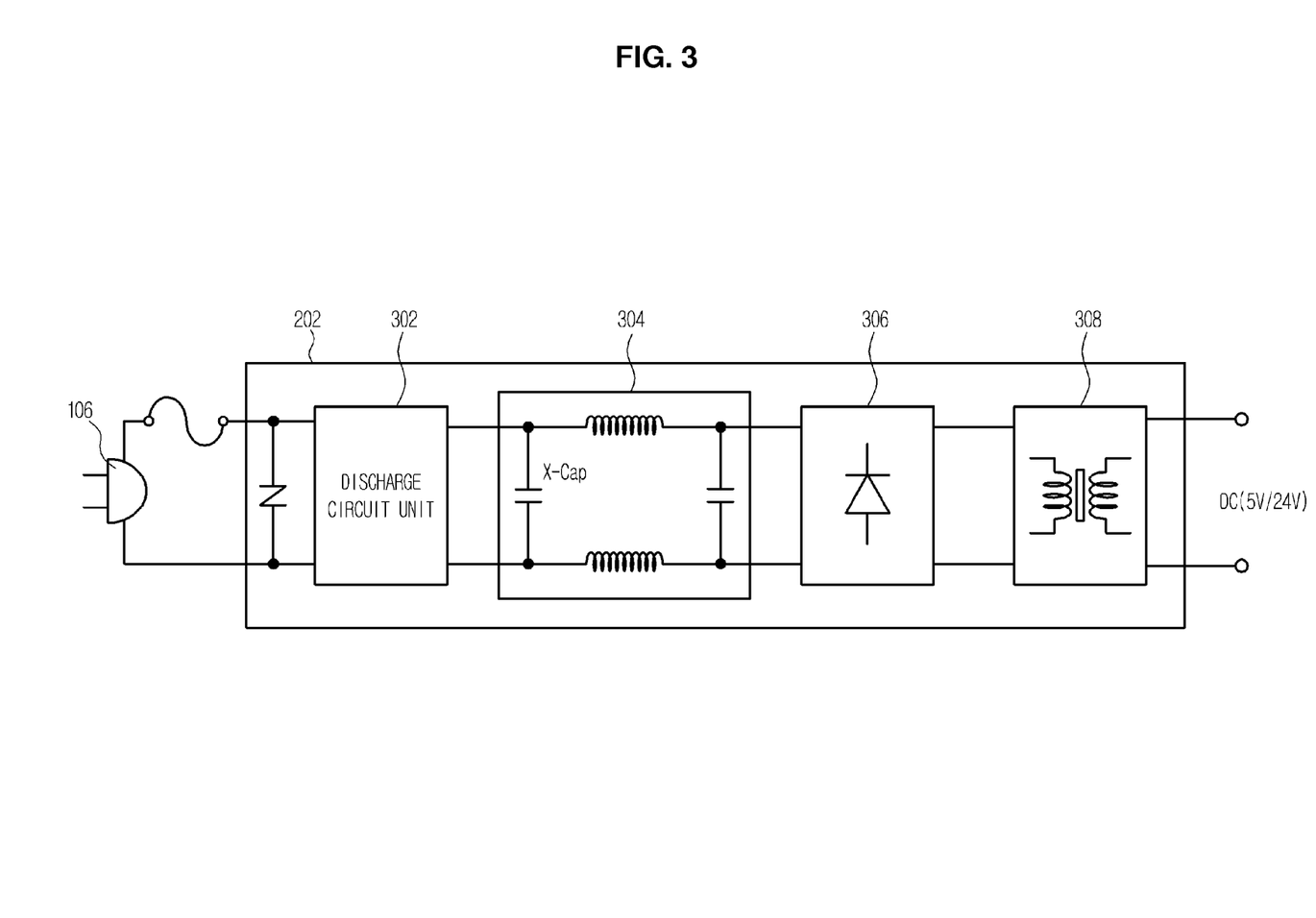
FIG. 3 illustrates an embodiment of a power supply.

FIG. 3 illustrates an embodiment of a power supply 202, for example, as illustrated in FIG. 2. The power supply 202 illustrated in FIG. 3 includes a discharge circuit unit 302, an electromagnetic interference (EMI) filter 304, a rectifier 306, and a transformer 308. The discharge circuit unit 302 discharges an X-cap (first capacitor) of the EMI filter 304. The EMI filter 304 may be a line filter made up of a coil and a capacitor in order to remove various noises included in the power, e.g., commercial power (AC power) supplied through the power cable 104. The rectifier 306 converts AC power to DC power, or converts a phase of the AC power to another desired phase. The transformer 308 lowers a voltage of the DC power rectified by the rectifier 306 to a desired level of DC voltage.

As illustrated in FIG. 3, the X-cap of the EMI filter 304 may be charged in a plug-on state by commercial power input to the power supply 202, and discharged by an action of the discharge circuit unit 302 when the plug-on state is changed to a plug-off state. If the X-Cap is not discharged after being charged, the charged voltage may be applied to opposite metal terminals of the plug 106. As such, it may be necessary to rapidly discharge the X-Cap for safety.

Figure 4:
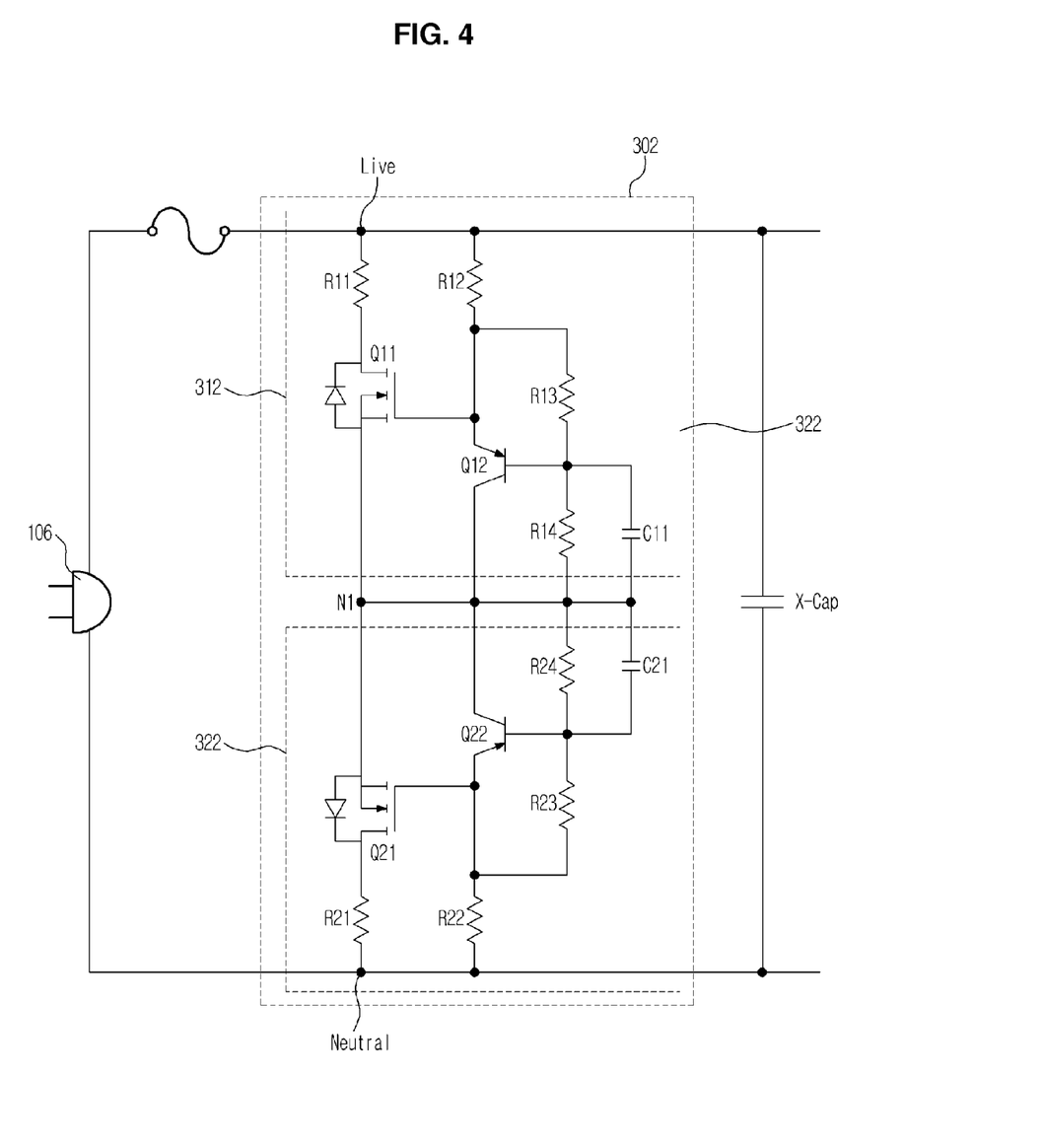
FIG. 4 illustrates an exemplary circuit configuration of a discharge circuit unit.

FIG. 4 illustrates a configuration of a discharge circuit unit 302, for example, as illustrated in FIG. 3. As illustrated in FIG. 4, the discharge circuit unit 302 according to the embodiment includes a first discharge circuit unit 312 powered to detect power, for example, for a positive (+) half period of the AC power, and a second discharge circuit unit 322 powered to detect power, for example, for a negative (−) half period of the AC power. The first and second discharge circuit units 312 and 322 may be connected in series between opposite ends Live and Neutral of an AC power input line, and may be disposed so as to have a symmetrical structure with respect to a node (first node) N1. A discharge resistor R11 and an N-channel enhancement type metal oxide semiconductor field effect transistor (MOSFET) Q11 and another N-channel enhancement type MOSFET Q21 and another discharge resistor R21 may be connected in series with the node N1 centered therebetween. Sources of the two MOSFETs Q11 and Q21 may be connected to the node N1. The two discharge resistors R11 and R21 discharge the X-cap in the event of plug-off. A current-limiting resistor R12 and a PNP type bipolar transistor Q12 and another PNP type bipolar transistor Q22 and another current-limiting resistor R22 may be connected in series between the opposite ends Live and Neutral of the AC power input line, and are connected in parallel with the discharge resistors R11 and R21. An emitter of the PNP type bipolar transistor Q12 may be connected to a gate of the MOSFET Q11, and an emitter of the other PNP type bipolar transistor Q22 may be connected to a gate of the other MOSFET Q21. Collectors of the two bipolar transistors Q12 and Q22 may be connected to the node N1. A resistor R13 may be connected between the emitter and a base of the bipolar transistor Q12, and a resistor R14 may be connected between the base and the collector of the bipolar transistor Q12. A resistor R23 may be connected between the emitter and a base of the other bipolar transistor Q22, and a resistor R24 may be connected between the base and the collector of the other bipolar transistor Q22. An AC coupling capacitor C11 may be connected to opposite ends of the resistor R14. An AC coupling capacitor C21 may be connected to opposite ends of the resistor R24.

According to an embodiment, the first discharge circuit unit 312 and the second discharge circuit unit 322 are symmetrically connected in series between the opposite ends Live and Neutral of the AC power input line with the node N1 centered therebetween. Due to this symmetrical serial connection structure, no current flows through the MOSFETs Q11 and Q21 or the bipolar transistors Q12 and Q22 for the positive and negative half periods of the AC power in the plug-on state, and only a very small amount of standby current flows through the resistors R12 and R22 having a relatively very great resistance value. In the discharge circuit unit 302 of FIG. 4, the resistance value of the resistor R12 may be relatively greater than that of the resistor R11 (e.g., about five times). The resistance value of the resistor R22 may be relatively greater than that of the resistor R21 (e.g., about five times). When the plug 106 is in the plug-on state, the current flows through the resistor R12 or R22 having the relatively greater resistance value. Thereby, power consumption caused by the standby current when the plug 106 is in the plug-on state is minimized.

In the event of the plug-off, the voltage charged in the X-cap should be reduced, for example, to a level harmless to a human body within a very short time (e.g., within one second). To do so, the X-cap should be able to be rapidly discharged. In the event of the plug-off, the electric charges of the X-cap should be discharged within as short a time as possible (e.g., within one second). In consideration of this, values of the resistor R14 and the capacitor C11 and values of the resistor R24 and the capacitor C21 are determined.

Assuming, for example, that turn-on voltage of the bipolar transistor Q22 is 0.7 V and that input voltage is rectified DC voltage, magnitudes of the resistor R24 and the capacitor C11 are set so that $$Vt = Vt \times 0.9 \times \left(1 - e^{\frac{-1}{R24C11}}\right)$$

and a time constant R24C11 is less than 8.45, and thereby the X-cap has only to be set to be discharged for a shortest time while the standby power is minimized. Since a discharge time of the X-cap relates to the electric charges charged by the unrectified AC power, the resistance values of the resistors R11 and R21 which meets the time constant RC<1 (where R is R11 or R21, and C is X-Cap) have only to be set.

The discharge circuit unit 302 illustrated in FIG. 4 may be divided into a discharge circuit and a detection circuit, in addition a division into the first discharge circuit 312 and the second discharge circuit 322. In the discharge circuit unit 302 of FIG. 4, the discharge circuit may be a circuit including the resistors R11 and R21 and the MOSFETs Q11 and Q21, and the detection circuit may be a circuit including the resistors R12, R13, R14, R22, R23, and R24 and the capacitors C11 and C21, and the bipolar transistors Q12 and Q22.

In the configuration of the discharge circuit unit 302 of FIG. 4, the other components excluding the resistors R11 and R21 for the discharge and the resistors R12 and R22 for limiting the current may be packaged into one semiconductor chip. Alternatively, in the configuration of the discharge circuit unit 302 of FIG. 4, the other components (including the resistors R12 and R22) excluding the resistors R11 and R21 for the discharge may be packaged into one semiconductor chip. Due to this packaged configuration, the discharge circuit unit can be simply configured by designing only the magnitudes of the resistors R11 and R21 or only the magnitudes of the resistors R11, R21, R12, and R22.

Figure 5A:
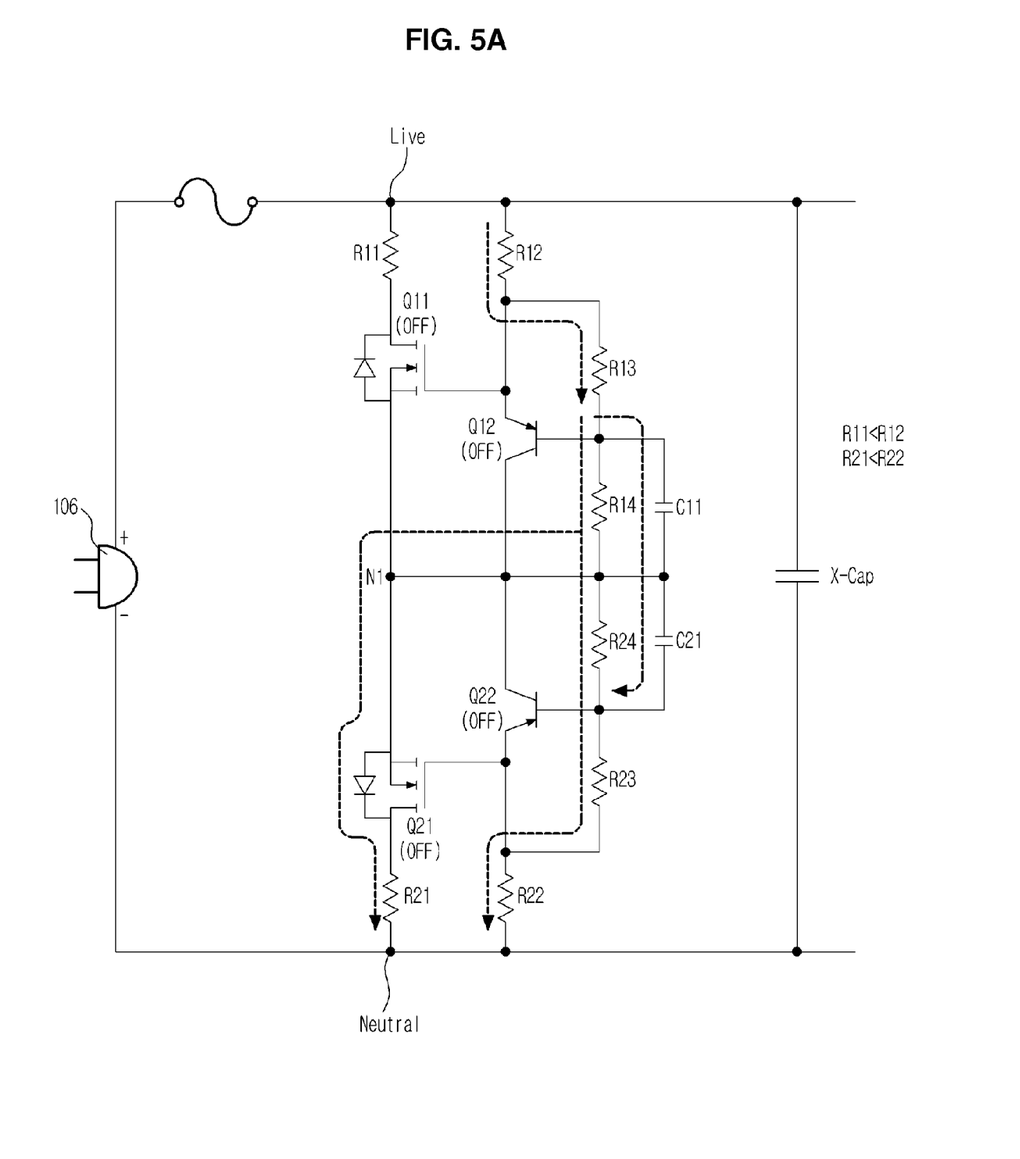
FIGS. 5A and 5B illustrate an operation of the discharge circuit unit for a positive (+) half period of AC power supplied to an image forming apparatus according to an embodiment.
Figure 5B:
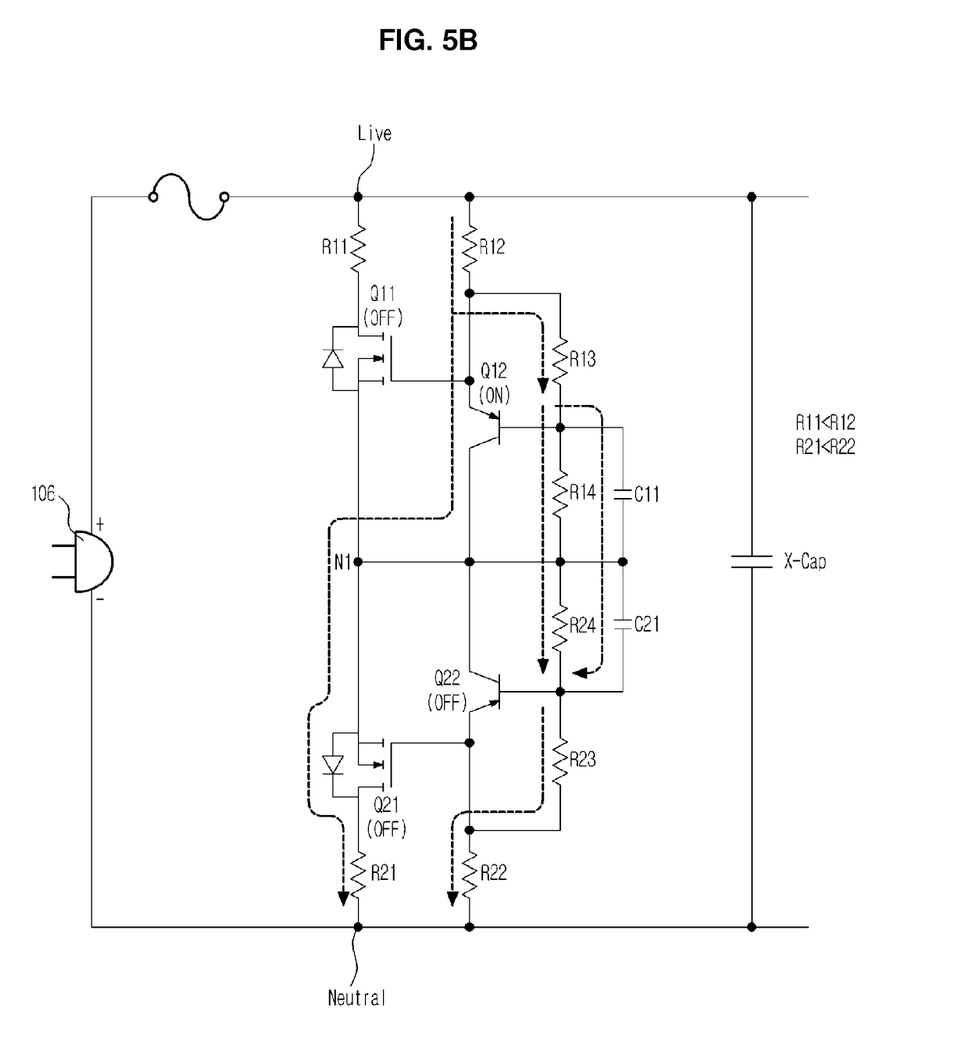

FIGS. 5A and 5B illustrate an operation of the discharge circuit unit for the positive (+) half period of the AC power supplied to the image forming apparatus according to an embodiment. Before the AC power is supplied (prior to the plug-on), no power is supplied, and thus the two MOSFETs Q11 and Q21 and the two bipolar transistors Q12 and Q22 are in a turn-off state. In this state, when the AC power begins to be supplied by the plug-on, only a very small amount of current flows through the resistor R12 whose resistance value is relatively greater than that of the resistor R11. A flow of the current is equal to a path indicated by an arrow of FIG. 5A. As illustrated in FIG. 5A, a small amount of standby current (detection current) flowing through the resistor R12 flows through: the resistor R13, the resistor R14, the MOSFET Q21 having a diode function, and the resistor R21; the resistors R13, R14, R24, R23, and R22; or the capacitors C11 and C21 and the resistors R23 and R22. An amount of the current flowing along this path may be sufficiently restricted by the resistor R12 having a great resistance value, and thus is very small. The resistance values of the resistors R12 and R22 may be determined in consideration of standby power regulations. As illustrated in FIG. 5B, since the capacitors C11 and C21 are virtually electrically short-circuited when the AC is input, a current of the base of the bipolar transistor Q12 flows to the end Neutral through the resistor R14 and the capacitor C11. Thus, PNP type bipolar transistor Q12 is turned on. When the bipolar transistor Q12 is turned on, a voltage of the emitter of the bipolar transistor Q12, i.e. the gate of the MOSFET Q11, electrically becomes a low level, and the N-channel enhancement type MOSFET Q11 is continuously maintained in a turn-off state. When the plug 106 is in the plug-on state, the current is caused to flow the resistors R12 and R22 having the relatively greater resistance value, and thereby the standby power of the image forming apparatus 102 is greatly reduced.

Figure 6A:
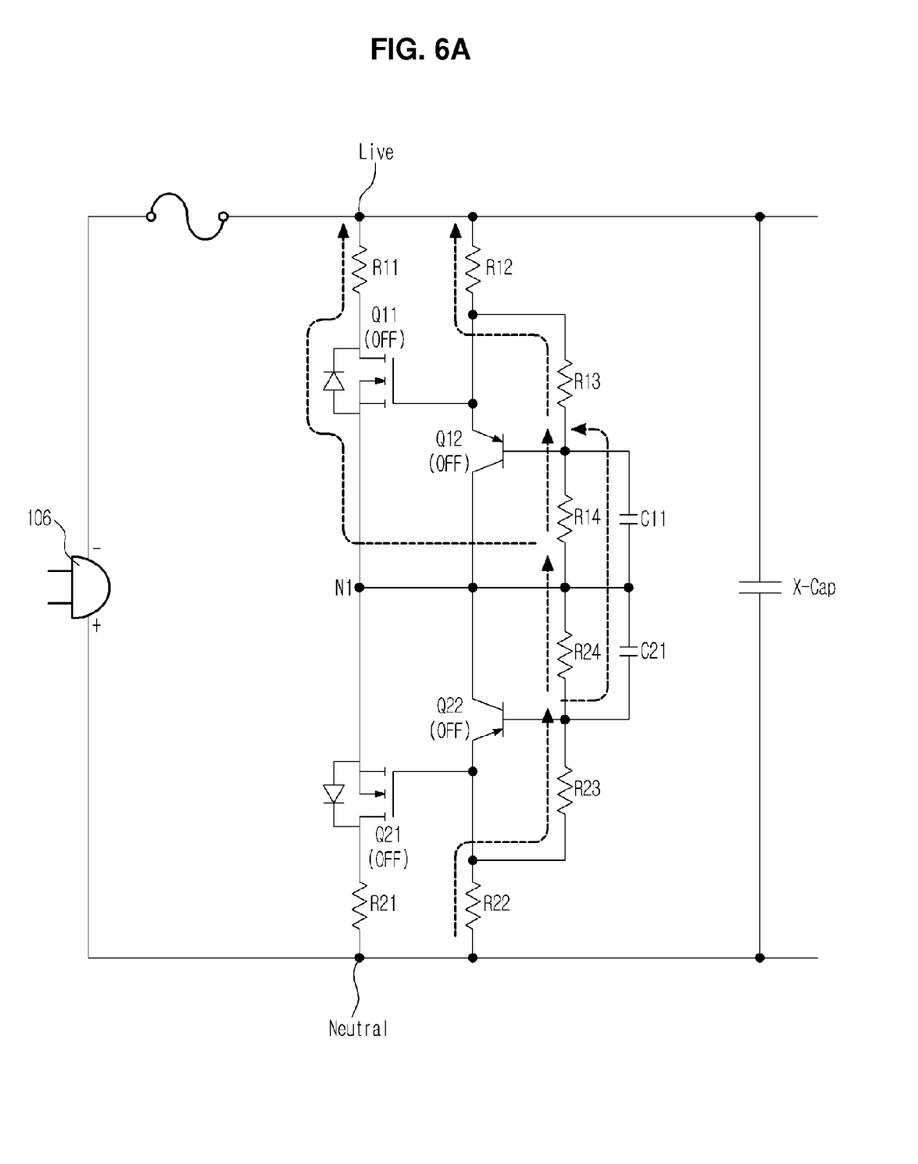
FIGS. 6A and 6B illustrate an operation of the discharge circuit unit for a negative (−) half period of AC power supplied to an image forming apparatus according to an embodiment.
Figure 6B:
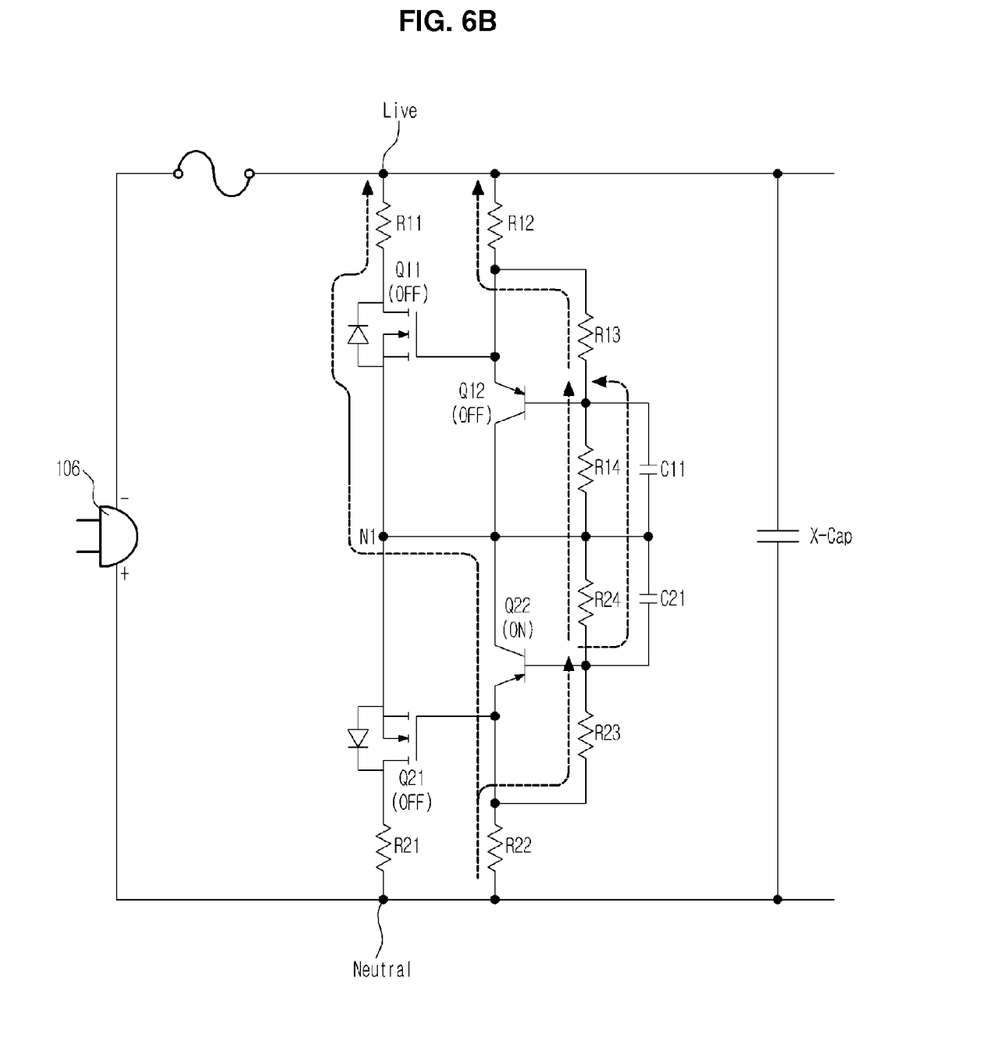

FIGS. 6A and 6B illustrate an operation of the discharge circuit unit for the negative (−) half period of the AC power supplied to the image forming apparatus according to an embodiment. When the AC power is converted from the positive (+) half period to the negative (−) half period, only a very small amount of current flows through the resistor R22 whose resistance value is relatively greater than that of the resistor R21. In this case, a flow of the current is equal to a path indicated by an arrow of FIG. 6A. As illustrated in FIG. 6A, a small amount of standby current (detection current) flowing through the resistor R22 flows through: the resistor R23, the resistor R24, the MOSFET Q11 having a diode function, and the resistor R11; the resistors R23, R24, R14, R13, and R12; or the capacitors C21 and C11 and the resistors R22 and R23. An amount of the current flowing along this path is sufficiently restricted by the resistor R22 having a great resistance value, and thus is very small. The resistance values of the resistors R12 and R22 may be preferably determined in consideration of the standby power regulations. As illustrated in FIG. 6B, since the capacitors C21 and C11 are virtually electrically short-circuited when the AC is input, a current of the base of the bipolar transistor Q22 flows to the end Live through the resistor R24 and the capacitor C21. For this reason, the PNP type bipolar transistor Q22 is turned on. When the bipolar transistor Q22 is turned on, a voltage of the emitter of the bipolar transistor Q22, i.e. the gate of the MOSFET Q21, electrically becomes a low level, and thus the N-channel enhancement type MOSFET Q21 is continuously maintained in a turn-off state. In this way, when the plug 106 is in the plug-on state, the current is caused to flow the resistors R22 and R12 having the relatively greater resistance value, and thereby the standby power of the image forming apparatus 102 is greatly reduced.

Figure 7A:
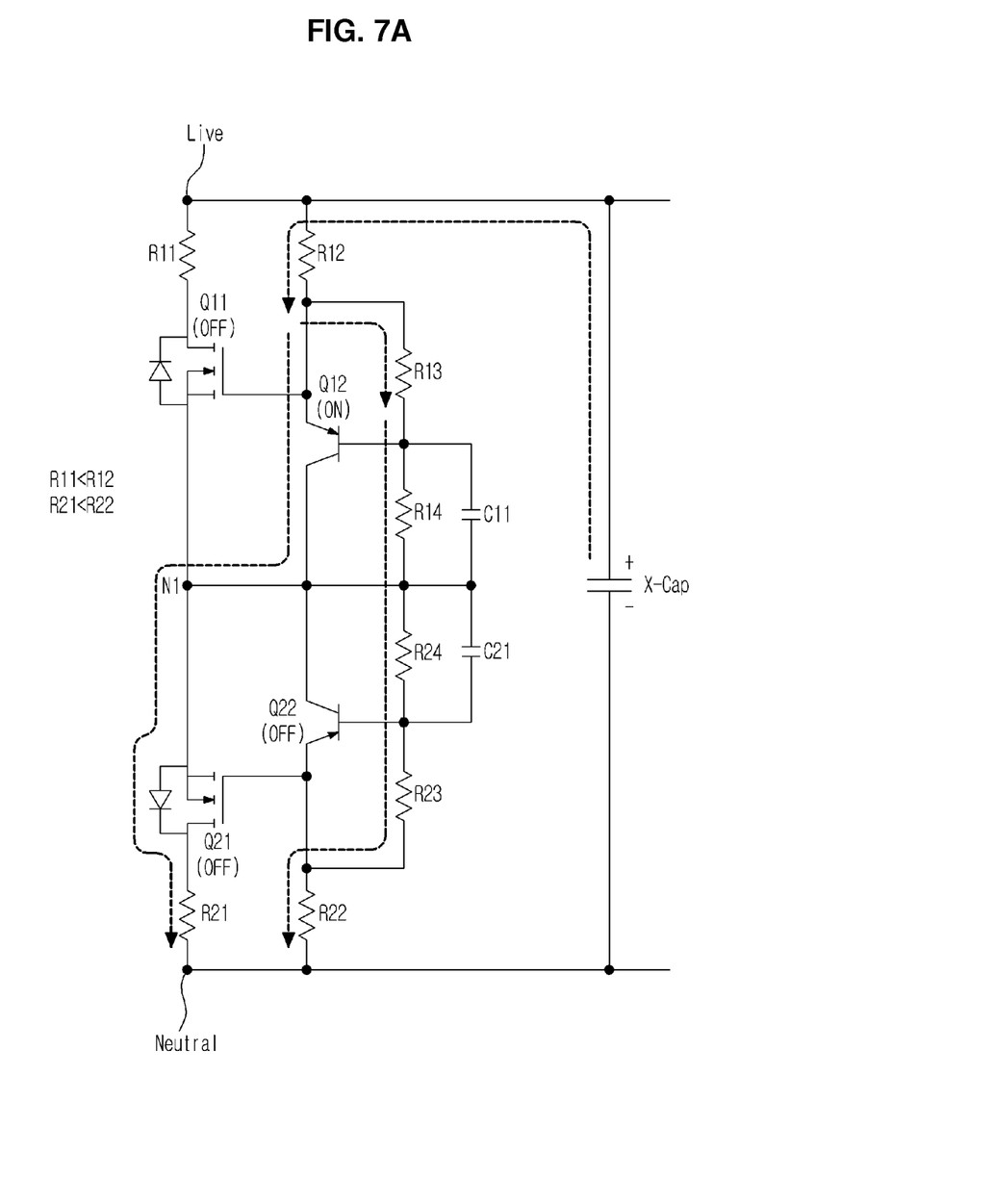
FIGS. 7A and 7B illustrate positive (+) discharge of the X-cap in the discharge circuit unit in the event of plug-off of an image forming apparatus according to an embodiment.
Figure 7B:
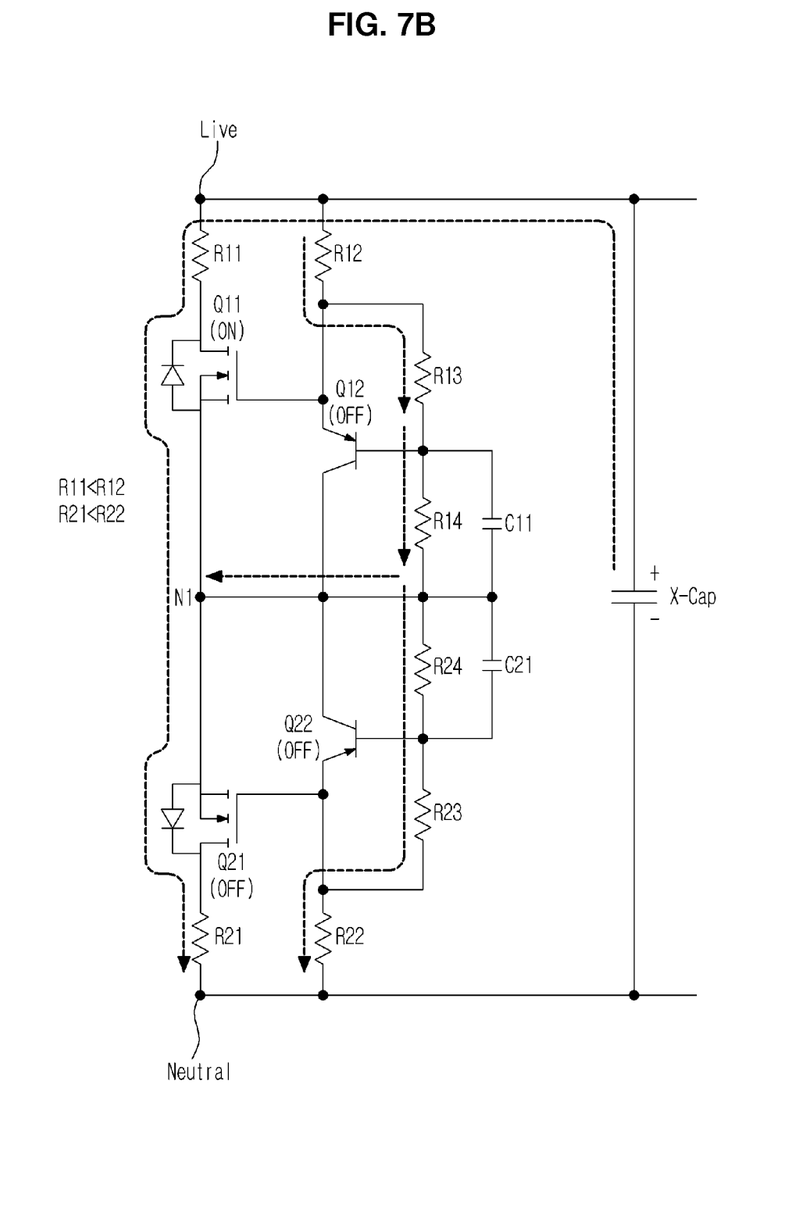
Figure 8A:
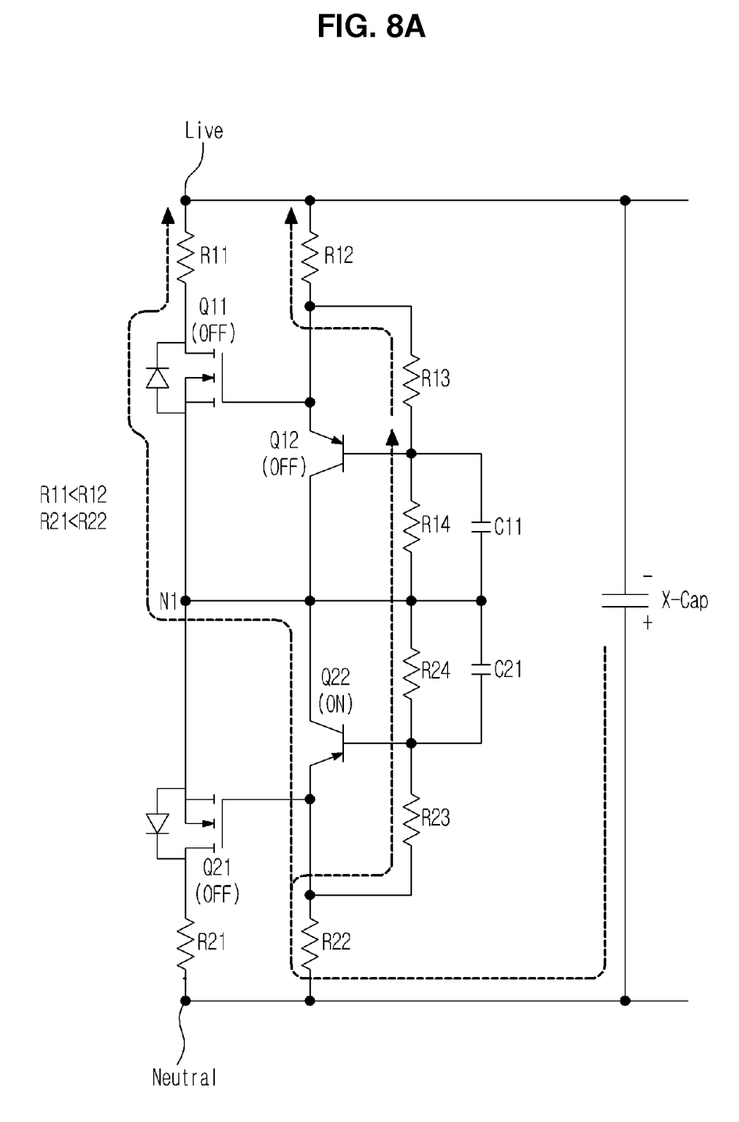
FIGS. 8A and 8B illustrate negative (−) discharge of the X-cap in the discharge circuit unit in an event of plug-off of the image forming apparatus according to an embodiment.
Figure 8B:
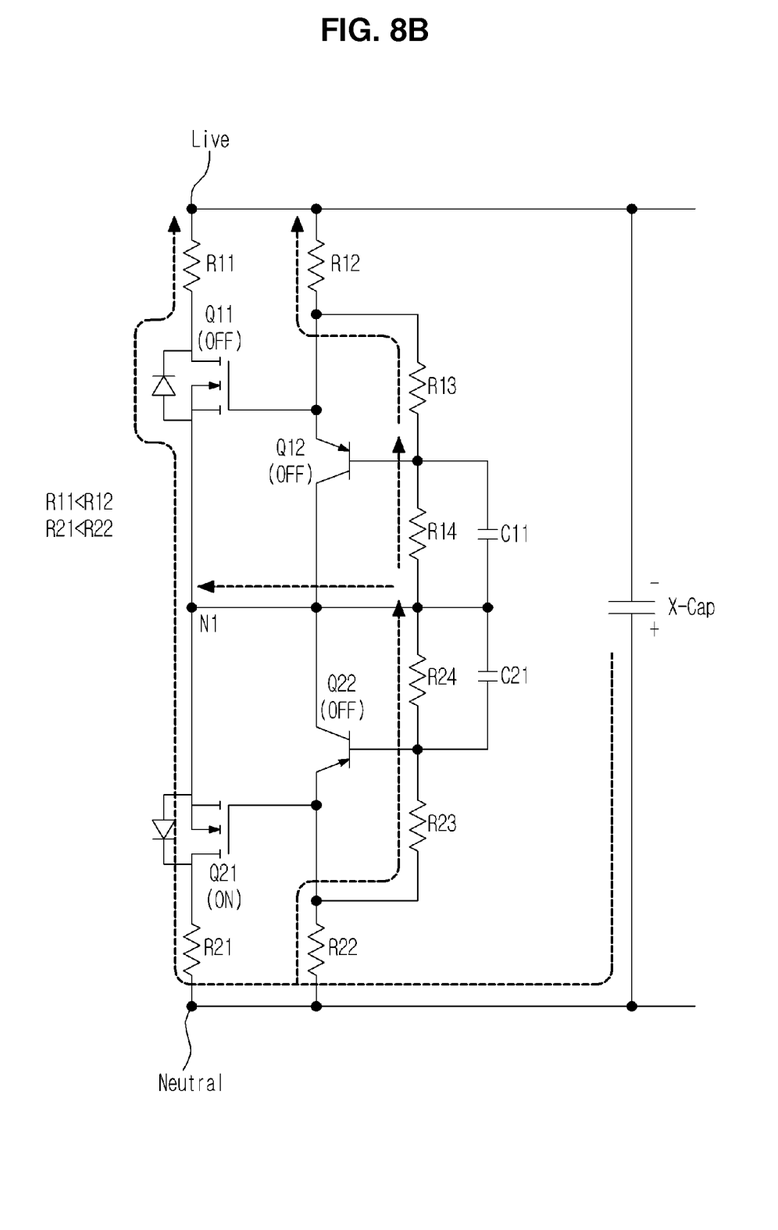

As illustrated in FIGS. 5A, 5B, 6A, and 6B, the X-cap is charged while the AC power is supplied. When the X-cap is charged, as illustrated in FIGS. 7A and 7B, the side of the end Live may be positive (+) polarity, and the side of the end Neutral may be negative (−) polarity. As illustrated in FIGS. 8A and 8B, the side of the end Live may be negative (−) polarity, and the side of the end Neutral may be positive (+) polarity. In this way, in the state in which the side of the end Live is the positive (+) polarity, and the side of the end Neutral is the negative (−) polarity, the plug 106 undergoes plug-off, and the X-cap is discharged, which is defined as positive (+) discharge. In the state in which the side of the end Live is the negative (−) polarity, and the side of the end Neutral is the positive (+) polarity, the plug 106 undergoes plug-off, and the X-cap is discharged, which may be defined as negative (−) discharge.

FIGS. 7A and 7B illustrate positive (+) discharge of the X-cap in the discharge circuit unit in an event of the plug-off of an image forming apparatus according to an embodiment. As illustrated in FIG. 7A, in the state in which the side of the end Live of the X-cap is the positive (+) polarity, and the side of the end Neutral of the X-cap is the negative (−) polarity, when the plug 106 undergoes plug-off, the electric charges charged in the X-cap begin to undergo positive (+) discharge. The MOSFET Q11 is turned off, and the bipolar transistor Q12 is turned on. As such, the X-cap is discharged through the resistor R12, the turned-on bipolar transistor Q12, the MOSFET Q22 having a diode function, and the resistor R21. The X-cap is discharged through the resistors R12, R13, R14, R24, R23, and R22. The capacitor C11 is charged by discharge current of the X-cap. When the capacitor C11 is charged, the flow of the current of the base of the bipolar transistor Q12 is interrupted. Thus, as illustrated in FIG. 7B, the bipolar transistor Q12 is turned off, and the voltage of the emitter of the bipolar transistor Q12 is electrically converted to a high level. Accordingly, the voltage of the gate of the N-channel enhancement type MOSFET Q11 is also converted to a high level, and the MOSFET Q11 is turned on. When the MOSFET Q11 is turned on, the X-cap is discharged through the resistor R11 having a relatively small resistance value, the turned-on MOSFET Q11, the MOSFET Q21 having a diode function, and the resistor R21. Due to R11<R12, and R21<R22, the X-cap can be rapidly discharged through the resistors R11 and R21 having a relatively small resistance value.

FIGS. 8A and 8B illustrate negative (−) discharge of the X-cap in the discharge circuit unit in the event of the plug-off of the image forming apparatus according to the embodiment. As illustrated in FIG. 8A, in the state in which the side of the end Live is the negative (−) polarity, and the side of the end Neutral is the positive (+) polarity, when the plug 106 undergoes plug-off, the electric charges charged in the X-cap begin to undergo negative (−) discharge. The MOSFET Q21 is turned off, and the bipolar transistor Q22 is turned on. As such, the X-cap is discharged through the resistor R22, the turned-on bipolar transistor Q22, the MOSFET Q12 having a diode function, and the resistor R21. The X-cap is discharged through the resistors R22, R23, R24, R14, R13, and R12. The capacitor C21 is charged by discharge current of the X-cap. When the capacitor C21 is charged, the flow of the current of the base of the bipolar transistor Q22 is interrupted. Thus, as illustrated in FIG. 8B, the bipolar transistor Q22 is turned off, and the voltage of the emitter of the bipolar transistor Q22 is electrically converted to a high level. Accordingly, the voltage of the gate of the N-channel enhancement type MOSFET Q21 is also converted to a high level, and the MOSFET Q21 is turned on. When the MOSFET Q21 is turned on, the X-cap is discharged through the resistor R21 having a relatively small resistance value, the turned-on MOSFET Q21, the MOSFET Q11 having a diode function, and the resistor R21. Due to R11<R12, and R21<R22, the X-cap can be rapidly discharged through the resistors R11 and R21 having a relatively small resistance value.

An exemplary embodiment can be applied to various electric appliances operated by the power supplied through the plug inserted into the socket and the power cable connected to the plug. For example, an exemplary appliance can be applied to various industrial apparatuses, office automation apparatuses, household electric appliances, etc. using the power as an energy source.

The discharge circuit unit and the image forming apparatus having the same in accordance with an embodiment can minimize standby power occurring in a standby mode of an electric product. The discharge circuit unit may be configured to be connected in series between opposite ends of an AC power input line. Thereby, it is possible to reduce the number of elements, to be easily commercialized, and to reduce consumption of standby power (detection power) while AC power is supplied. AC blocking is realized using MOSFET having a diode function, and thereby a separate blocking diode is not required.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A discharge circuit unit that is connectable to an input line of alternating current (AC) power and discharges a first capacitor, the discharge circuit unit comprising:
a discharge circuit that includes a first resistance unit connected in series with a second resistance unit including a first and a second switch having sources that are interconnected to form a first node and that are turned on and off in response to a discharge control signal generated when an input of the AC power is interrupted so as to discharge first capacitor; and
a detection circuit that includes a third resistance unit connected in series with a fourth resistance unit including a third and a fourth switch that are transistors and turned on and off by the input of the AC power and the interruption of the AC power so as to generate the discharge control signal from emitters of the third and fourth switches when the input of the AC power is interrupted, a second capacitor is connected between the base of the third switch and the first node, a fifth resistor connected between the emitter and the base of the third switch, a sixth resistor connected between the emitter and the base of the fourth switch, a third capacitor connected between the base of the fourth switch and the first node, a seventh resistor connected in parallel to the second capacitor, and an eighth resistor connected in parallel to the third capacitor, and wherein each of the first to fourth resistance units includes at least one first resistor, second resistor, third resistor and fourth resistor respectively;
wherein the detection circuit is configured so that:
collectors of the third and the fourth switch are interconnected and connected to the first node; and
the discharge control signal is output from emitters of the third and fourth switches.

2. The discharge circuit unit according to claim 1, wherein the third resistance unit and the fourth resistance unit of the detection circuit have a relatively greater resistance value than the first and second resistance units of the discharge circuit.

3. The discharge circuit unit according to claim 1, wherein: the first resistor, the first switch, the second switch, and the second resistor are connected in series between opposite ends of the input line of the AC power.

4. The discharge circuit unit according to claim 1, wherein the first switch and the second switch of the discharge circuit are N-channel enhancement type metal oxide semiconductor field effect transistors (MOSFETs).

5. The discharge circuit unit according to claim 4, wherein: the first switch and the second switch have drains that are connected to the first and second resistors, respectively; and the first switch and the second switch have gates into which the discharge control signal is input.

6. The discharge circuit unit according to claim 1, wherein the first resistor and the second resistor of the discharge circuit have the same resistance value.

7. The discharge circuit unit according to claim 1, wherein the fourth resistance unit of the detection circuit includes the third resistor and the fourth resistor.

8. The discharge circuit unit according to claim 7, wherein the third resistor, the third switch, the fourth switch, and the fourth resistor are connected in series between opposite ends of the input line of the AC power.

9. The discharge circuit unit according to claim 1, wherein the third switch and the fourth switch of the detection circuit are transistors that are PNP type bipolar transistors.

10. The discharge circuit unit according to claim 7, wherein the third resistor and the fourth resistor of the detection circuit have the same resistance value.

11. The discharge according to claim 1, wherein the first capacitor is discharged for reducing noise.

12. An image forming apparatus having a discharge circuit unit that is connectable to an input line of alternating current (AC) power and discharges a first capacitor, the discharge circuit unit comprising:
a discharge circuit that includes a first resistance unit connected in series with a second resistance unit including a first and a second switch having sources that are interconnected to form a first node and that are turned on and off in response to a discharge control signal generated when an input of the AC power is interrupted so as to discharge first capacitor; and
a detection circuit that includes a third resistance unit connected in series with a fourth resistance unit including a third and a fourth switch that are transistors and turned on and off by the input of the AC power and the interruption of the AC power so as to generate the discharge control signal from emitters of the third and fourth switches when the input of the AC power is interrupted, a second capacitor is connected between the base of the third switch and the first node, a fifth resistor connected between the emitter and the base of the third switch, a sixth resistor connected between the emitter and the base of the fourth switch, a third capacitor connected between the base of the fourth switch and the first node, a seventh resistor connected in parallel to the second capacitor, and an eighth resistor connected in parallel to the third capacitor, and wherein each of the first to fourth resistance units includes at least one first resistor, second resistor, third resistor and fourth resistor respectively;
wherein the detection circuit is configured so that:
collectors of the third and the fourth switch are interconnected and connected to the first node; and
the discharge control signal is output from emitters of the third and fourth switches.

13. The image forming apparatus according to claim 12, wherein the third resistance unit and the fourth resistance unit of the detection circuit have a relatively greater resistance value than the first resistance unit and the second resistance unit of the discharge circuit.

14. The image forming apparatus according to claim 12, wherein the first resistor and the second resistor of the discharge circuit have the same resistance value.

15. The image forming apparatus according to claim 12, wherein: the fourth resistance unit of the detection circuit includes the third resistor and the fourth resistor.

16. The image forming apparatus according to claim 15, wherein the third resistor and the fourth resistor of the detection circuit have the same resistance value.

17. The image forming apparatus according to claim 12, wherein the first capacitor is discharged to reduce noise.

* * * * *